(12) United States Patent
Kozar et al.

(10) Patent No.: US 10,639,988 B2
(45) Date of Patent: May 5, 2020

(54) ENERGY ABSORBING FLUID BLADDER SYSTEMS AND METHODS

(71) Applicant: The Boeing Company, Chicago, IL (US)

(72) Inventors: Michael Patrick Kozar, Mercer Island, WA (US); Mark S. Wilenski, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 66 days.

(21) Appl. No.: 15/703,929

(22) Filed: Sep. 13, 2017

(65) Prior Publication Data

US 2019/0077251 A1     Mar. 14, 2019

(51) Int. Cl.

| B60K 15/077 | (2006.01) |
| B64D 37/08 | (2006.01) |
| B64D 37/32 | (2006.01) |
| B64C 27/04 | (2006.01) |
| B65D 88/22 | (2006.01) |
| B65D 90/52 | (2006.01) |
| B60K 15/03 | (2006.01) |

(52) U.S. Cl.
CPC ............ *B60K 15/077* (2013.01); *B64C 27/04* (2013.01); *B64D 37/08* (2013.01); *B64D 37/32* (2013.01); *B65D 88/22* (2013.01); *B65D 90/52* (2013.01); *B60K 15/03177* (2013.01); *B60K 2015/0344* (2013.01); *B60K 2015/0775* (2013.01); *B60K 2015/0777* (2013.01); *B60Y 2200/50* (2013.01); *B60Y 2200/52* (2013.01); *F17C 2201/0166* (2013.01); *F17C 2201/0171* (2013.01); *F17C 2260/016* (2013.01); *Y10T 137/86212* (2015.04)

(58) Field of Classification Search
CPC ........ B65D 88/22; B65D 90/52; B64D 37/08; B60K 15/077; B60K 2015/0344; B60K 2015/0775; B60K 2015/0777; F17C 2260/016; F17C 2201/0166; F17C 2201/0171; Y10T 137/86212
See application file for complete search history.

(56) References Cited

U.S. PATENT DOCUMENTS

| 5,927,651 | A | 7/1999 | Geders et al. | |
| 6,360,729 | B1 | 3/2002 | Ellsworth | |
| 9,493,068 | B2 * | 11/2016 | Li | B60K 15/077 |
| 2002/0195149 | A1 * | 12/2002 | Demircioglv | B64D 37/32 137/574 |
| 2011/0272413 | A1 * | 11/2011 | Yaremenko | B65D 88/1606 220/563 |

* cited by examiner

*Primary Examiner* — Atif H Chaudry
(74) *Attorney, Agent, or Firm* — Haynes and Boone, LLP (57) ABSTRACT

Various techniques are provided for an energy absorbing fluid bladder. In one example, the fluid bladder includes a bladder body and a perforated baffle structure. The perforated baffle structure can be disposed within the bladder body and configured to mitigate a pulse of fluid (e.g., fuel) moving within the bladder body before the pulse reaches the bladder body. Related methods are also disclosed.

20 Claims, 10 Drawing Sheets

ENERGY ABSORBING FLUID BLADDER SYSTEMS AND METHODS

CROSS-REFERENCE TO RELATED APPLICATIONS

This application is related to U.S. patent application Ser. No. 15/698,573 filed Sep. 7, 2017 and entitled "EXPANDABLE ENERGY ABSORBING FLUID BLADDER SYSTEMS AND METHODS", which is incorporated herein by reference in its entirety.

TECHNICAL FIELD

The disclosure relates generally to vehicle systems and more specifically to rupture resistant flexible vehicle fluid bladders having a structure that is configured to mitigate pulses by flowing fluid through perforations, deform, expand, and/or otherwise absorb energy to prevent rupture of the fluid bladder.

BACKGROUND

Existing vehicle fluid bladders, when subjected to a force, can cause fluid contained within a fluid bladder to exert a pulse on a sidewall of the fluid bladder that can lead to rupture of the fluid bladder. Therefore, improved techniques are needed for fluid bladders.

SUMMARY

Systems and methods are disclosed for an energy absorbing fluid bladder. In certain examples, a fluid bladder is disclosed that includes a bladder body and a baffle structure disposed within the flexible bladder body and configured to mitigate a pulse of fluid moving within the bladder body before the pulse reaches the bladder body.

In certain other examples, a method is disclosed that includes receiving a force to move fluid disposed within a bladder body of a fluid bladder and moving at least a portion of the fluid through a perforated baffle structure disposed within the bladder body to mitigate a pulse of the fluid moving within the bladder body before the pulse reaches the bladder body.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of an energy absorbing fluid bladder are disclosed herein along with related methods. As an illustrative example, a fluid bladder includes a bladder body and a baffle structure disposed within the bladder body and configured to mitigate a certain force over time or distance herein referred to as a pulse of fuel moving within the bladder body before the pulse reaches the bladder body. Pulse duration, peak force, and rate of force application (e.g. pulse shape) may be mitigated through various features of the bladder body and/or baffle structure described herein. For the purposes of this disclosure, "pulse" and/or "force" can refer to a force, a pulse (force over time), an acceleration, a jerk (acceleration over time), and/or other such force, momentum, and/or acceleration related physical forces. In certain examples, the baffle structure of the fluid bladder can be configured to receive the pulse of the fluid (e.g., fuel) and mitigate such a pulse. For example, such a pulse can be mitigated by flowing fuel through the baffle structure to cause pressure drop.

The baffle structures described herein can be constructed from any appropriate material such as, for example, metals (e.g., steel, aluminum, titanium, copper, and/or other metals), composites (e.g., fiberglass, carbon fiber, Kevlar®, and/or other such composites), plastics, and/or other such materials. Additionally, any surface of the baffle structures described herein can include perforations of any size and geometry.

Figure 1:
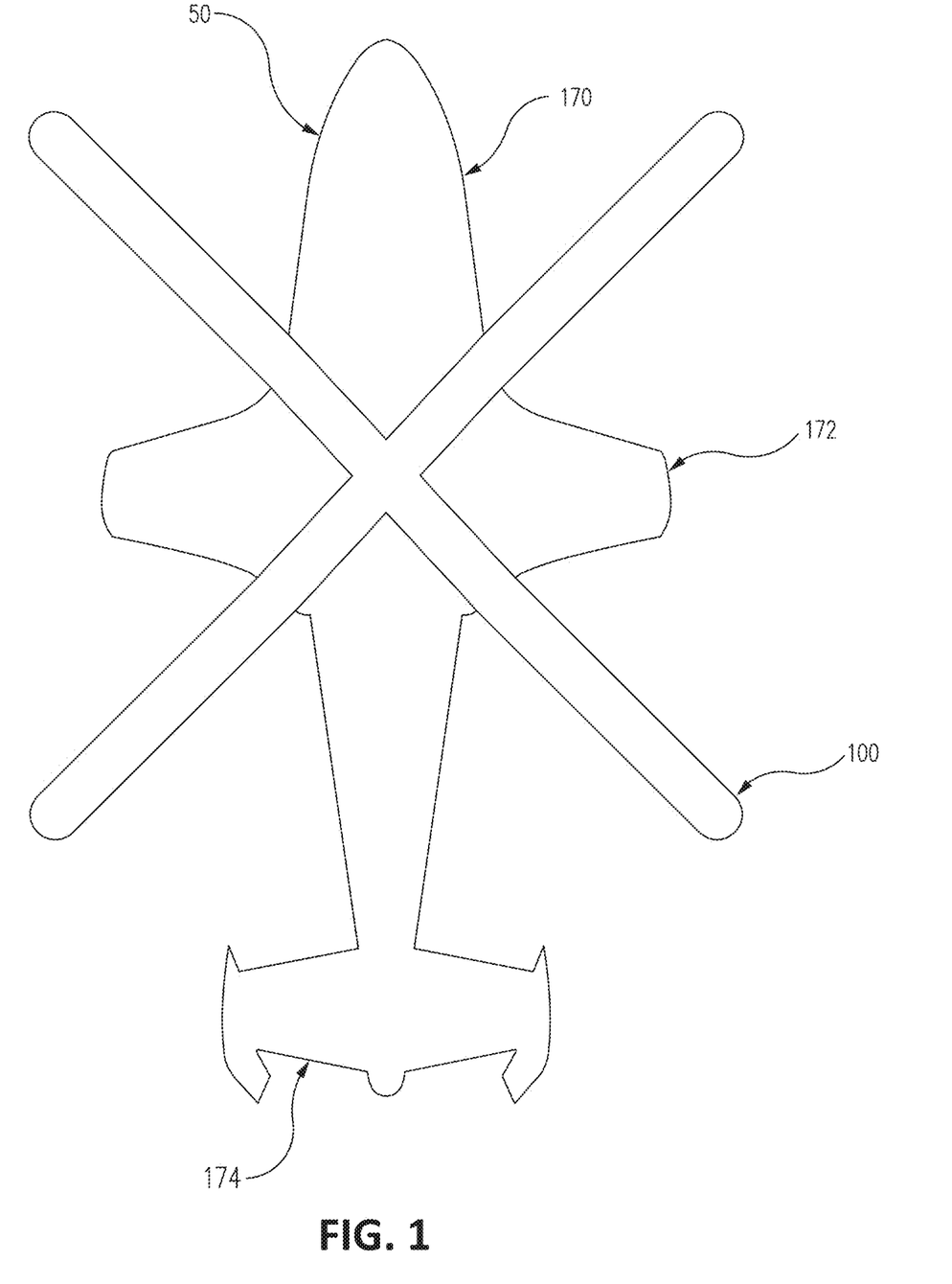
FIG. 1 illustrates an aircraft in accordance with an example of the disclosure.

FIG. 1 illustrates an aircraft in accordance with an example of the disclosure. The aircraft 50 of FIG. 1 includes a fuselage 170, wings 172, tail 174, and propulsion system 100. Though aircraft 50 shown in FIG. 1 is that of a vertical take-off and landing (VTOL) aircraft, other example aircraft that can utilize the fluid bladder with baffle structure disclosed herein can include short take-off and landing (STOL) or short take-off and vertical landing (STOVL) aircraft, fixed wing aircraft, remotely piloted aircraft, other types of aircraft, watercraft, automobiles, locomotives, spacecraft, and/or vehicle or other forms of transport. As such, though the propulsion system 100 shown in FIG. 1 is a VTOL propeller, other examples can include propulsion systems that include other thrust producing systems such as turbofans, turboprops, ramjets, and other such systems, as well as internal combustion engines, electric drivetrains, and/or other such propulsion systems. The fluid bladder described in this disclosure is, thus, applicable to any type of vehicle and propulsion system and can be, for example, a fuel bladder.

The aircraft 50 can contain the fluid bladder with baffle structure inside and/or outside the aircraft 50. For example, the fluid bladder with baffle structure can be contained within the fuselage 170, wings 172, and/or tail 714 (e.g., disposed internally within the vehicle structure of the aircraft 50) and/or outside the fuselage 170, wings 172, and/or tail 714 on, for example, external fuel tanks coupled to the fuselage 170 and/or the wings 172. In certain examples using external fuel tanks, the fluid bladder can be located within a hard outer tank.

The aircraft 50 described in FIG. 1 is exemplary and it is appreciated that in other examples, the aircraft 50 may include less or additional components (e.g., no horizontal stabilizer, additional stabilizers, additional sensors, and/or additional controllers). Also, concepts described herein can extend to other aircraft such as helicopters, fixed wing aircraft, Unmanned Aerial Vehicles, etc. and/or other vehicles (e.g., automobiles, watercraft, and/or trains).

Figure 2A:
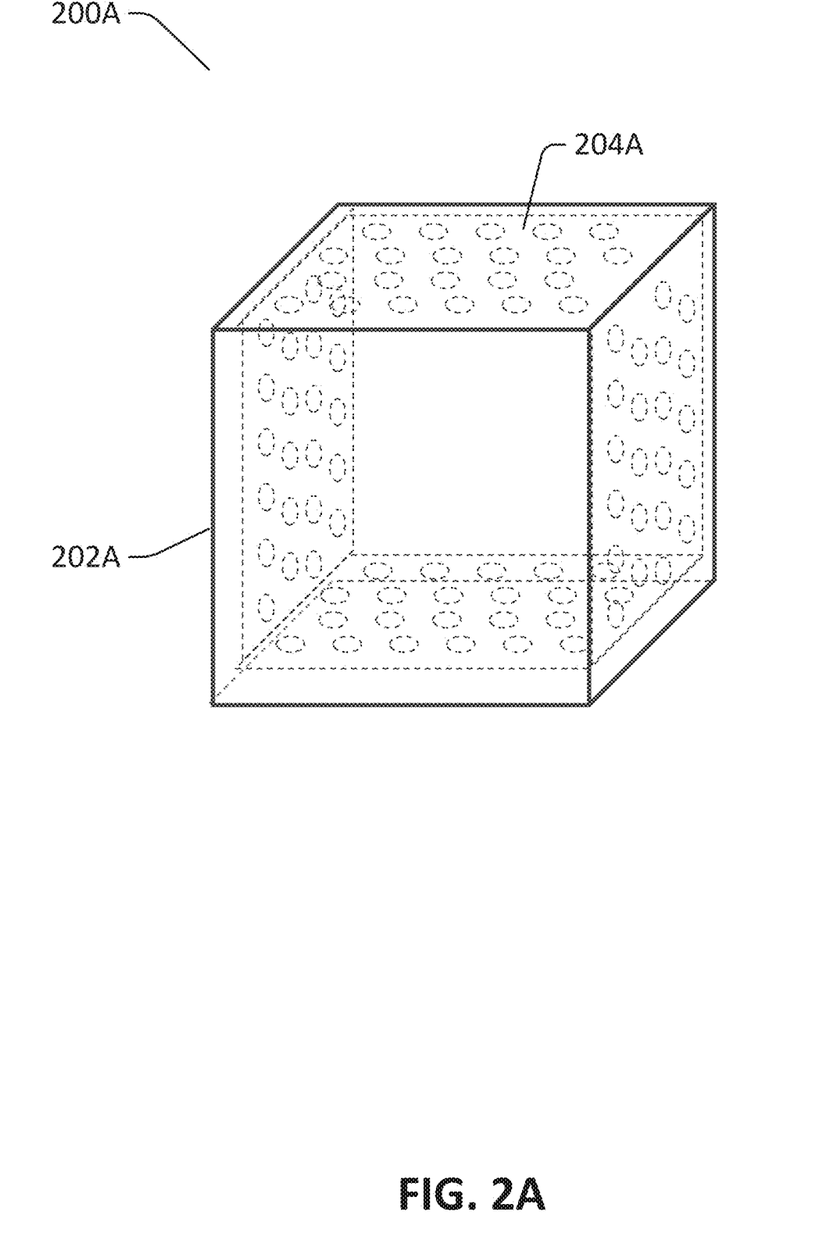
FIG. 2A illustrates an example of a fluid bladder with a perforated baffle structure in accordance with an example of the disclosure.
Figure 2B:
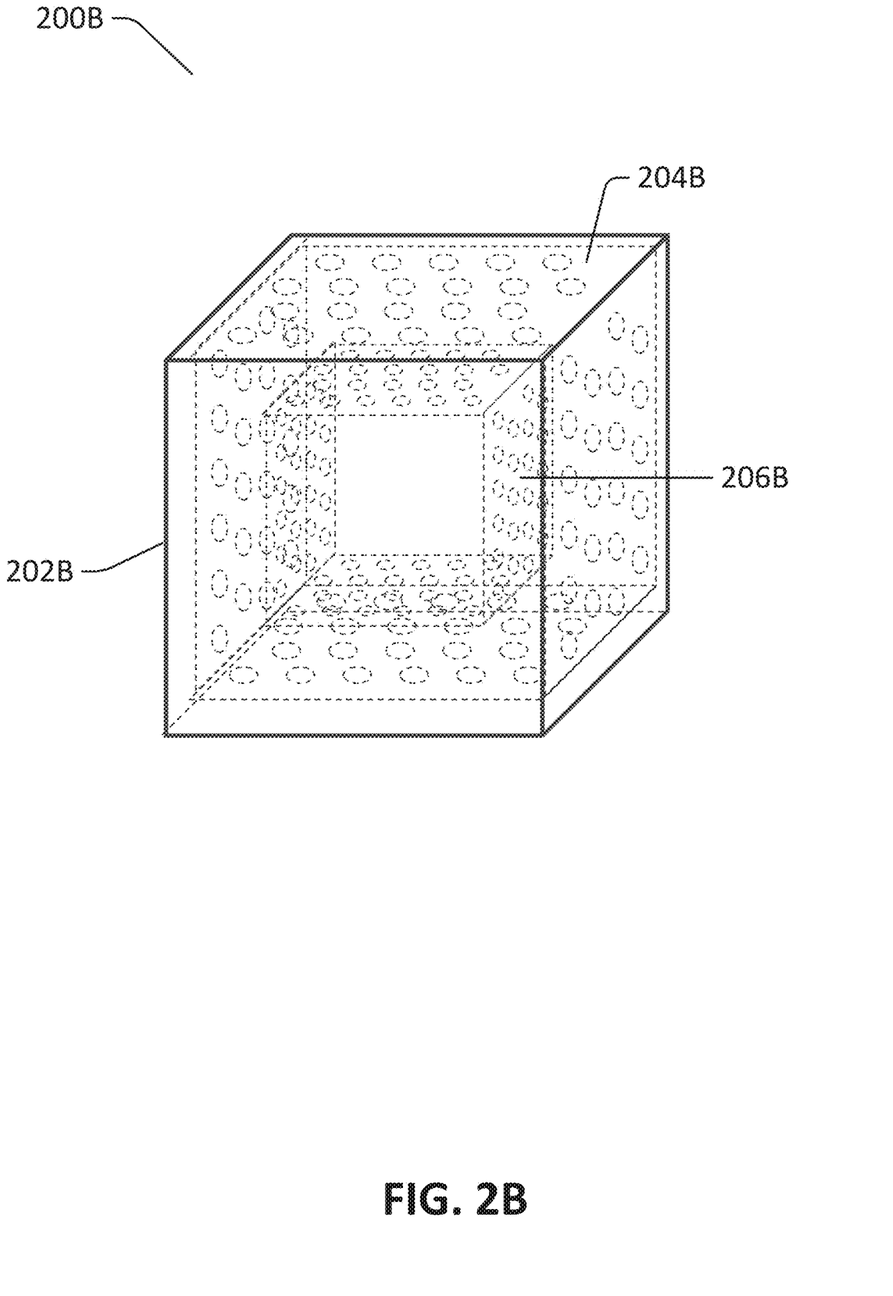
FIG. 2B illustrates another example of a fluid bladder with a perforated baffle structure in accordance with an example of the disclosure.

FIG. 2A illustrates an example of a fluid bladder with a perforated baffle structure in accordance with an example of the disclosure. FIG. 2A illustrates a fluid bladder 200A with a bladder body 202A and a baffle structure 204A. Certain examples of the baffle structures shown in FIGS. 2A and 2B can include front and rear perforations, but in FIGS. 2A and 2B shown herein, front and rear face perforations are omitted for clarity purposes.

The bladder body 202A can be configured to contain a fluid, such as fuel. In certain examples, the bladder body 202A can be a flexible bladder body that can deflect and/or deform when subjected to a force. As such, the bladder body 202A can vary in shape according to forces received, the volume of fuel within the bladder body 202A, packaging requirements, and/or other such factors. Other examples of the bladder body 202A can be rigid.

In certain examples, during normal operation, the bladder body 202A can contain fluid and both the bladder body 202A and the fluid could be moving at a certain velocity. The bladder body 202A can then be subjected to a sudden acceleration (e.g., from being sped up, slowed down, from changing directions, and/or from being suddenly lifted and/or dropped). Though the bladder body 202A can respond quickly to the sudden acceleration, the fluid within the bladder body 202A can continue to have momentum/inertia. The momentum/inertia of fluid can thus cause a pulse on the bladder body 202A.

The bladder body 202A and/or fuel located within the bladder body 202A can receive a force (e.g., during operation of the aircraft 50). Upon receiving the force, the fluid (e.g., fuel) contained within the bladder body 202A can exert a pulse on the bladder body 202A (e.g., moving fuel within the bladder body 202A). The baffle structure 204A can be configured to mitigate such a pulse before the pulse reaches the bladder body 202A.

The baffle structure 204A can be disposed within the bladder body 202A and be configured to contain at least a portion of fluid that is contained by the bladder body 202A. In certain examples, the baffle structure 204A can be disposed close to the bladder body 202A so that the majority of fluid contained within the bladder body 202A is contained within the baffle structure 204A. The baffle structure 204A can be a perforated structure that includes one or more perforations and fluid contained within the bladder body 202A can be forced to flow through such perforations before contacting the bladder body 202A. As such, if the fluid receives a force that creates a pulse within the fluid, flowing the fluid through the perforations can mitigate the pulse before the pulse reaches the bladder body 202A.

In certain examples, the baffle structure 204A can be configured to mitigate the pulse at least when the pulse is within a predetermined pulse range. The baffle structure 204A can be configured to flow fluid through the perforations and such perforations can cause a pressure drop when the fluid is flowed through the baffle structure 204A. The perforations of the baffle structure 204A can be configured so that fluid flowing at a rate greater than a threshold rate can be choked and, thus, can provide increased resistance to the fluid flowing at such a rate. Fluid flowing at a rate below the threshold rate can be subjected to a smaller flow resistance. As such, the baffle structure 204A can be configured to more greatly mitigate the pulse of the flowing fluid when the pulse is greater than a threshold pulse. Such a threshold pulse can, for example, be a pulse lower than the amount of pulse that would lead to damage (e.g., rupture) of the bladder body 202A if the bladder body 202A were subjected to such a pulse.

The perforations of the baffle structure 204A can mitigate the pulse by limiting a peak pulse pressure of the moving fluid. Accordingly, the perforations of the baffle structure 204A can be sized to limit such peak pulse pressure. For example, smaller perforations can limit such peak pulse pressure to a greater extent than larger perforations, which can allow a greater peak pulse pressure. Such perforations can be configured to limit the peak pulse pressure to a pulse pressure that does not cause damage to the bladder body 202A.

The amount of perforations can also be varied. In certain examples, the amount of perforations can be varied to allow for a desired flow rate of fluid through the baffle structure 204A. For example, a certain flow rate of fluid can be desired to continuously provide fluid (e.g., fuel) to the propulsion system 100 of the aircraft 50. As such, the baffle structure 204A can include any size and/or number of perforations to allow for such a flow rate.

In certain examples, the baffle structure 204A can be configured to absorb at least a portion of the pulse. The baffle structure 204A can be configured to deform in response to absorbing the portion of pulse (e.g., the baffle structure 204A can be made of a deformable material) and/or when absorbing a pulse greater than a threshold deformation pulse. Such deformation can further prevent any pulse from the flowing fluid to damage the bladder body 202A. As such the baffle structure 204A can be configured to deform to, for example, further block any flow path of the fluid.

In certain such examples, the perforations of the baffle structure 204A can be configured to deform responsive to such a pulse to absorb the pulse. For example, the perforations can include one or more cutouts, weak points, and/or other designed in features and/or places that deform when such perforations absorb a pulse greater than threshold deformation pulse. In certain such examples, the perforations can be configured to deform to further block any flow path of the fluid.

Additionally or alternatively, the perforations of the baffle structure 204A can be configured to direct flow of the fluid towards a certain area. For example, the fluid can be directed towards a reinforced area of the bladder body 202A and/or a portion of the baffle structure 204A configured to absorb a greater pulse. As such, the bladder body 202A and/or the baffle structure 204A can be configured to absorb greater pulses while minimizing weight. In certain such examples, the fluid can be directed by appropriately sizing one of more perforations. Such examples can include perforations of different sizes to increase flow resistance through certain portions of the baffle structure 204A and, thus, direct greater flow to portions of the baffle structure 204A that have lower flow resistance (e.g., have larger perforations and/or a greater number of perforations).

As shown in FIG. 2A, the bladder body 202A can be a hexahedral or substantially hexahedral shaped structure. The baffle structure 204A can also be a hexahedral or substantially hexahedral shaped structure configured to be disposed within the bladder body 202A. The shape of the baffle structure 204A can be substantially similar to the bladder body 202A and can be only slightly smaller than the bladder body 202A to contain the majority of fluid (e.g., fuel) disposed within the bladder body 202A when the bladder body 202A is filled.

The baffle structure 204A can include one or more perforations as shown in FIG. 2A. Though, as shown, the baffle structure 204A can include perforations of the same size that are disposed at regular intervals, other examples of baffle structures can include perforations of different sizes and/or perforations that are irregularly shaped. Additionally, the baffle structures and/or perforations described herein can vary in shape according to forces received. In certain such examples, the shape of the baffle structures and/or perforations can change shape or cross-section in response to pulse intensity.

FIG. 2B illustrates another example of a fluid bladder with a perforated baffle structure in accordance with an example of the disclosure. FIG. 2B includes a fluid bladder 200B that includes a bladder body 202B and baffle structures 204B and 206B. As shown in FIG. 2B, the baffle structure 206B is nested within baffle structure 204B. That is, the baffle structure 206B is contained within the baffle structure 204B.

Each of the baffle structures 204B and 206B can include features such as perforations, material selections, and/or other features that are configured to mitigate a pulse of fuel moving within the bladder body 202B, as described herein. The configuration of FIG. 2B, with the baffle structure 206B nested within the baffle structure 204B can allow for further mitigation of the pulse. In certain such configurations, the baffle structure 206B can be coupled to the baffle structure 204B, but the baffle structure 206B in other configurations can be free floating within the baffle structure 204B. In configurations where the baffle structure 206B is coupled to the baffle structure 204B, the baffle structure 206B can be rigidly coupled to the baffle structure 204B (e.g., held in a fixed spatial relationship by, for example, one or rigid links such as metal, polymers, or composite bars) or can be coupled so that the baffle structure 206B can move relative to the baffle structure 204B (e.g., held by elastic bands, springs, or other deformable materials).

Figure 2C:
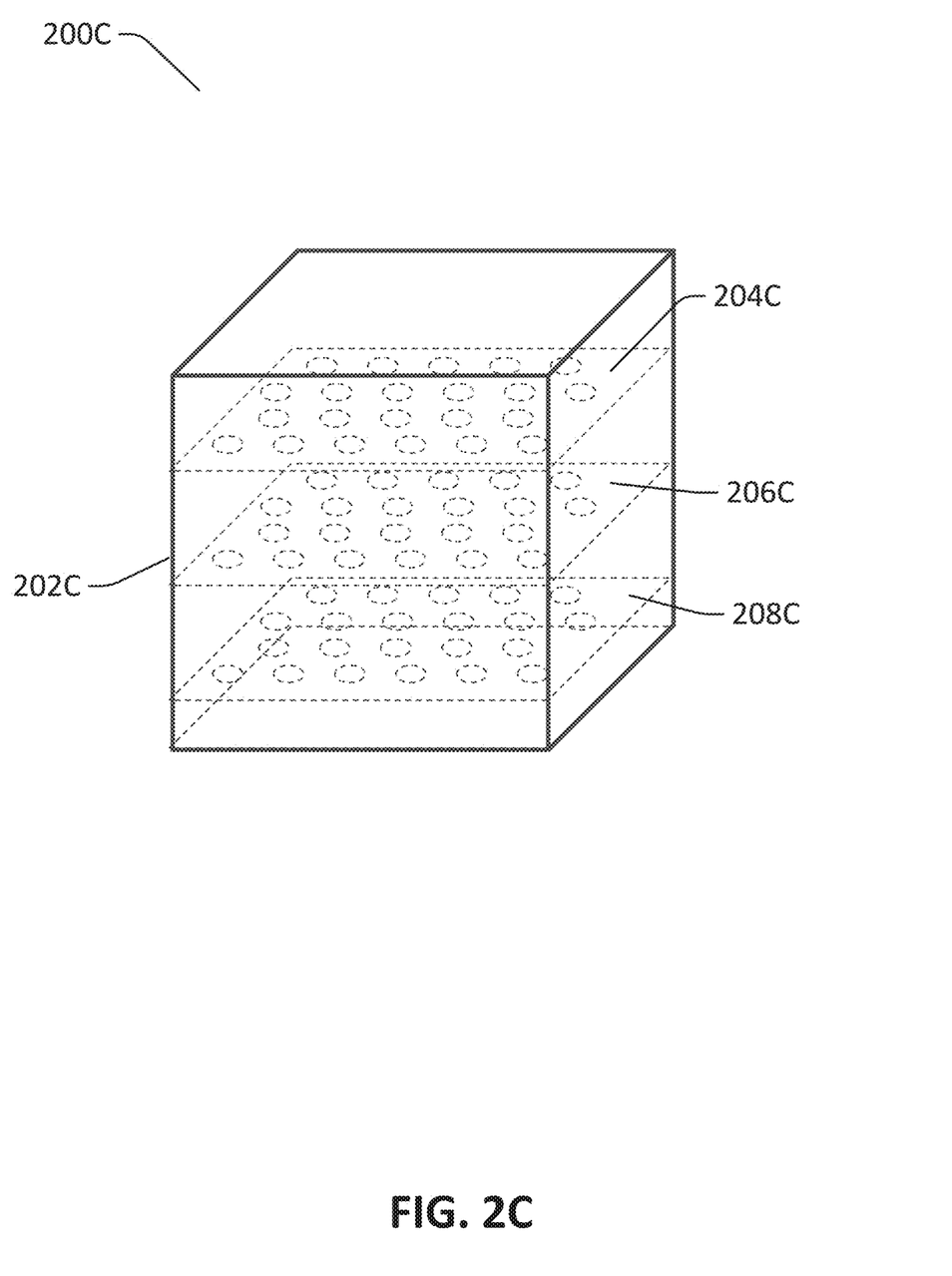
FIG. 2C illustrates a further example of a fluid bladder with a perforated baffle structure in accordance with an example of the disclosure.

FIG. 2C illustrates a further example of a fluid bladder with a perforated baffle structure in accordance with an example of the disclosure. Fluid bladder 200C includes a bladder body 202C and baffle structures 204C, 206C, and 208C. Baffle structures 204C, 206C, and 208C are substantially planar baffle structures (e.g., a perforated sheet). That is, each of baffle structures 204C, 206C, and 208C are oriented on a plane within bladder body 202C. Though FIG. 2C illustrates baffle structures 204C, 206C, and 208C as oriented substantially parallel with each other, other examples can orient one or more baffle structures non-parallel to one or more other baffle structures. Substantially planar baffle structures can be configured to mitigate pulses in certain directions. Such a configuration can be helpful if pulses are more likely to originate and/or propagate in certain directions.

Each of baffle structures 204C, 206C, and 208C can be coupled to the bladder body 202C (e.g., with shared parts such as shared faces, through fabric, through fasteners, through adhesives, and/or through one or more other fastening techniques). In certain examples, the coupling can be configured to deform and/or decouple if a force higher than a deformation force is imparted to the baffle structure and, thus, prevent further damage to the bladder body 202C.

Figure 2D:
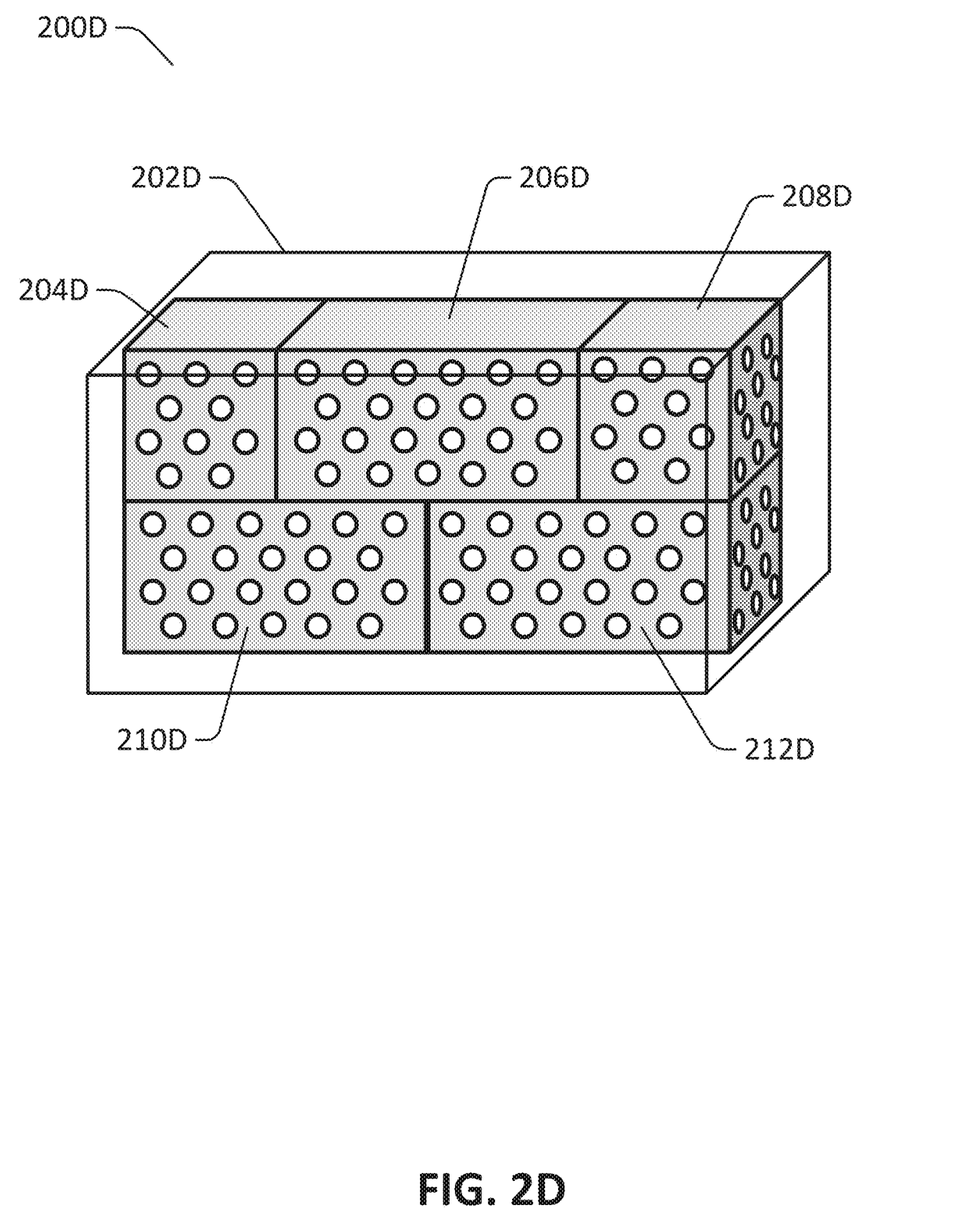
FIG. 2D illustrates an additional example of a fluid bladder with a perforated baffle structure in accordance with an example of the disclosure.

FIG. 2D illustrates an additional example of a fluid bladder with a perforated baffle structure in accordance with an example of the disclosure. Fluid bladder 200D includes a bladder body 202D and baffle structures 204D, 206D, 208D, 210D, and 212D. As shown, baffle structures 204D, 206D, 208D, 210D, and 212D are disposed next to each other. In certain examples, each of baffle structures 204D, 206D, 208D, 210D, and 212D can be coupled to one or more other baffle structures (e.g., with shared parts such as shared faces, through fabric, through fasteners, through adhesives, and/or through one or more other fastening techniques) while other examples can include one or more baffle structures that are free floating within fluid bladder 200D.

Baffle structures 204D, 206D, 208D, 210D, and 212D are cuboid baffle structures similar to baffle structures 204A, 204B, and 206B. In other examples, baffle structures 204D, 206D, 208D, 210D, and/or 212D can be baffle structures of other shapes, such as parallelepipeds, rhombohedrons, a tetrahedron, and/or other prisms, prismatoids, spheres, polyhedrons, and/or other 3-dimensional shapes.

For fluid bladder 200D, baffle structures 204D and 208D can be similar in shape and/or volume to each other, but different in shape and/or volume from baffle structures 206D, 210D, and 212D. Baffle structures 210D and 212D can be similar in shape and/or volume to each other, but different in shape and/or volume from baffle structures 204D, 206D, and 208D. Each of the baffle structures 204D, 206D, 208D, 210D, and/or 212D can include one of more perforations and be configured to mitigate a pulse. As such, each of the baffle structures 204D, 206D, 208D, 210D, and/or 212D can reduce or prevent damage to the bladder body 202D due to the pulse.

Baffle structures of different shapes can allow for further fine tuning of pulse mitigation. Disposing different shaped baffle structures in different portions of the bladder body can, for example, allow for pulses to be further mitigated closer to the walls of the bladder body and/or allow for baffle structures to be arranged in a manner so that greater mitigation is available in portions of the bladder body that are expected to experience greater pulses.

Various other configurations of baffle structures can be used within the fluid bladders disclosed herein. FIGS. 3-6 describe certain non-limiting examples of such various baffle structures. It is appreciated that one or more baffle structures described herein can be used individually within a bladder body and/or a plurality of such structures can be combined within a bladder body.

Figure 3:
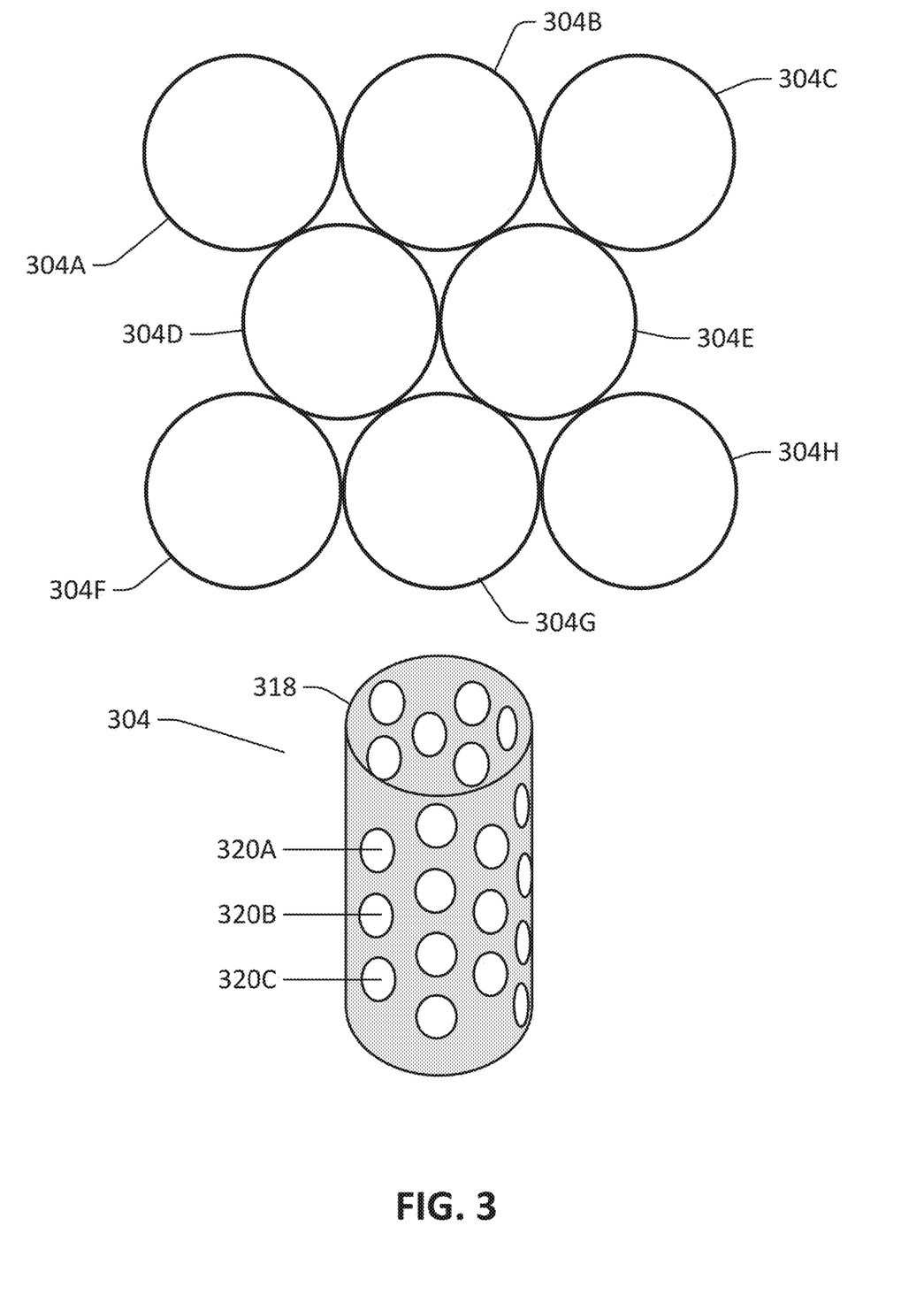
FIG. 3 illustrates a perforated baffle structure in accordance with an example of the disclosure.

FIG. 3 illustrates a perforated baffle structure in accordance with an example of the disclosure. FIG. 3 illustrates a plurality of baffle structures 304A-H. Each of the baffle structures 304A-H is a cylindrical baffle structure with a perforated wall on the side of the baffle structure and an open top and bottom. As shown, baffle structure 304 can include a baffle body 318 and a plurality of perforations including perforations 320A-C. As such, baffle structures 304A-H can be configured to mitigate pulses traveling towards or away from the sides of the baffle structures 304A-H. Other examples of such cylindrical baffle structures can include a base and/or a top with or without perforations.

Each of the plurality of baffle structures 304A-H can be coupled to one or more other baffle structures 304A-H. In certain examples, the baffle structures 304A-H can be welded and/or otherwise coupled to each other as described herein. Other examples can include uncoupled baffle structures.

Figure 4:
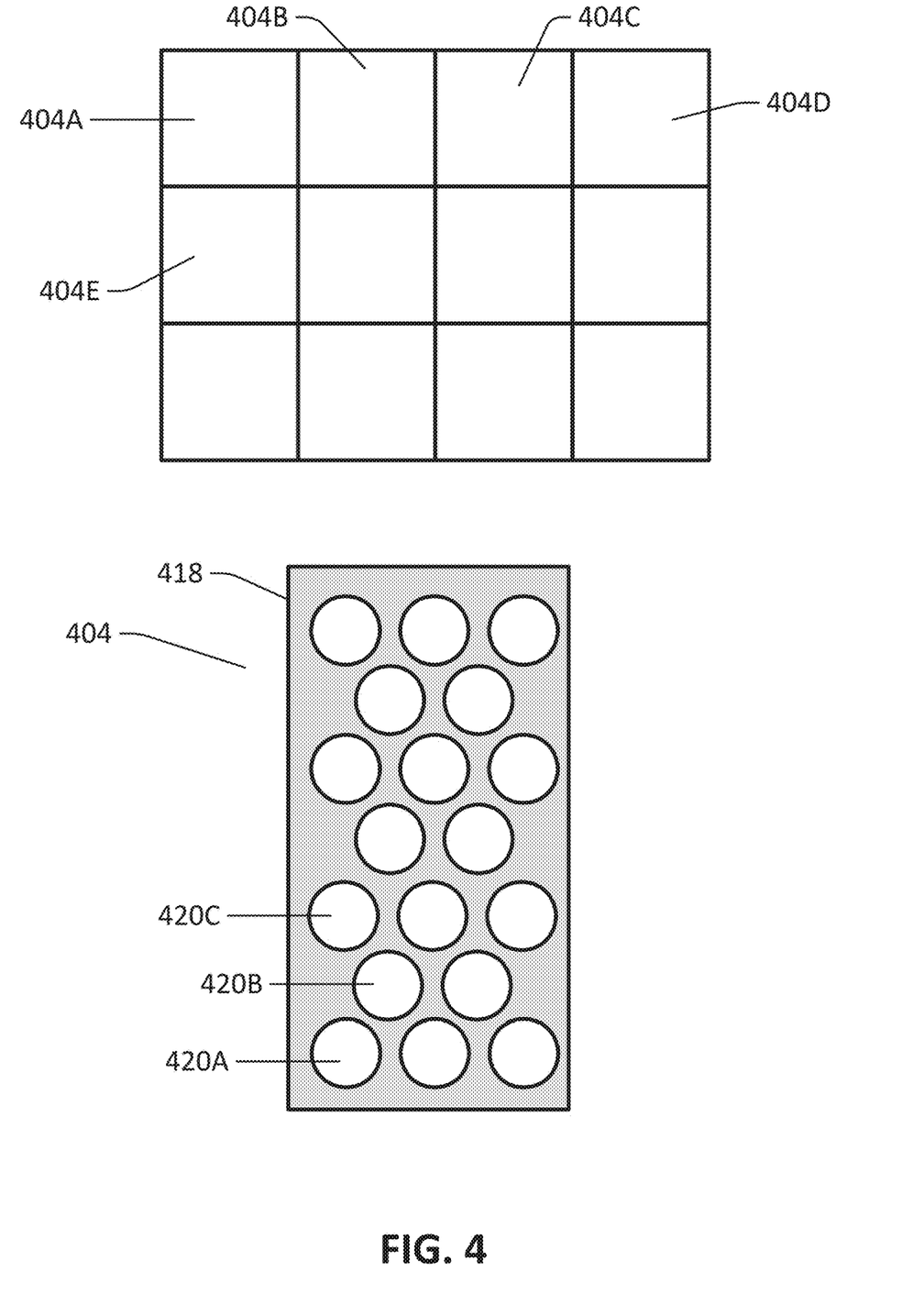
FIG. 4 illustrates another perforated baffle structure in accordance with an example of the disclosure.

FIG. 4 illustrates another perforated baffle structure in accordance with an example of the disclosure. FIG. 4 illustrates a plurality of baffle structures 404A-E. Each of the baffle structures 404A-E is a cuboid baffle structure with perforations on the side of the baffle structure (e.g., perforated walls) and open top and bottom. As shown, baffle structure 404 can include a baffle body 418 and a plurality of perforations including perforations 420A-C. Other examples of such cuboid baffle structures can include a base and/or a top with or without perforations.

Each of the plurality of baffle structures 404A-E shares one or more sidewalls with another of the baffle structures 404A-E. Such a configuration can allow for a full baffle structure that includes a plurality of individual chambers made up of baffle structures 404A-E. Such a structure can flow fluid (e.g., fuel) through a plurality of faces of the baffle structure and each face can further mitigate pulses.

Figure 5:
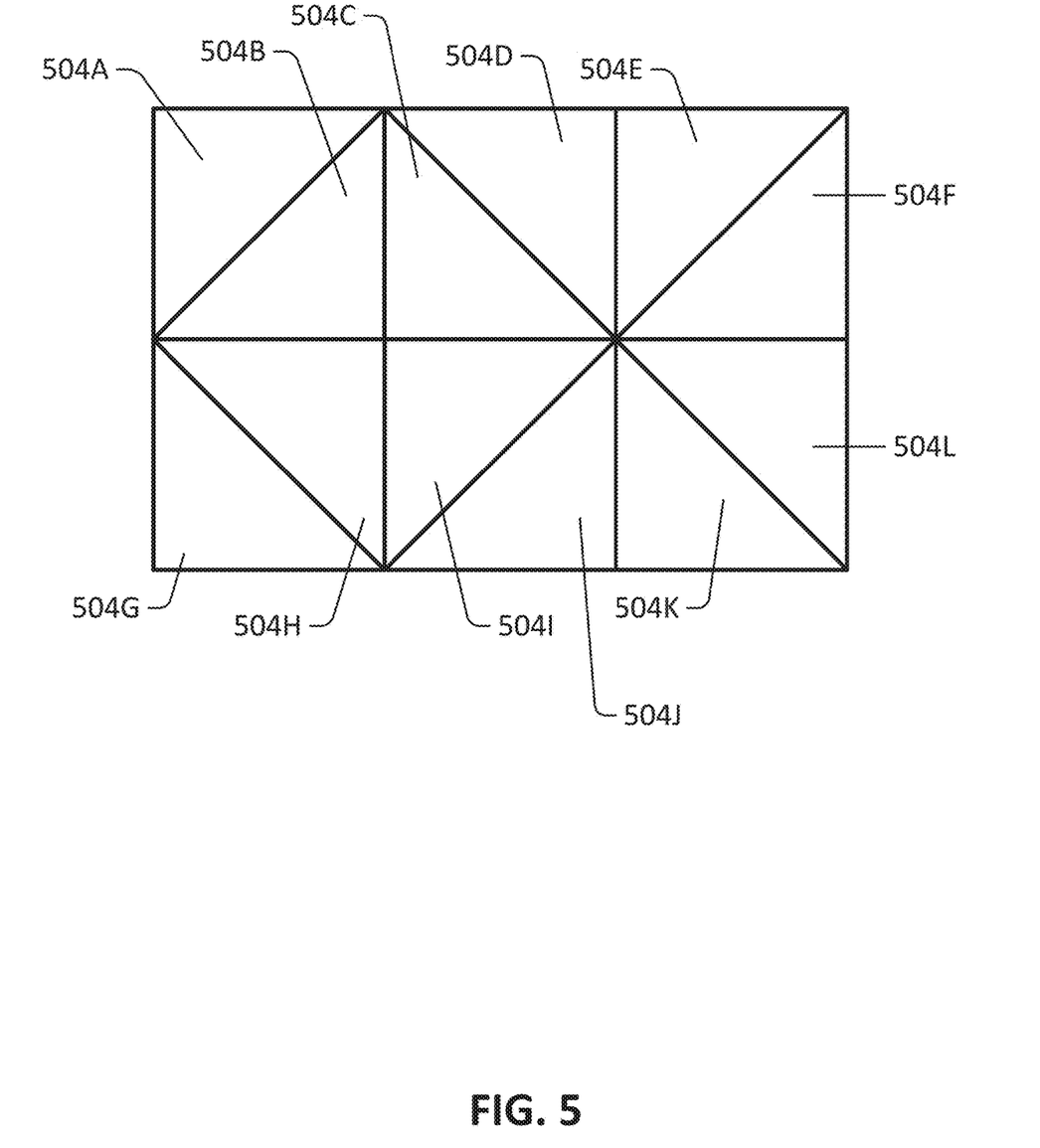
FIG. 5 illustrates a further perforated baffle structure in accordance with an example of the disclosure.

FIG. 5 illustrates a further perforated baffle structure in accordance with an example of the disclosure. Each of the baffle structures 504A-L is a triangular prism baffle structure. FIG. 5 can illustrate another configuration of the baffle structure of FIG. 4 with triangular prisms instead of cuboid shapes.

Figure 6:
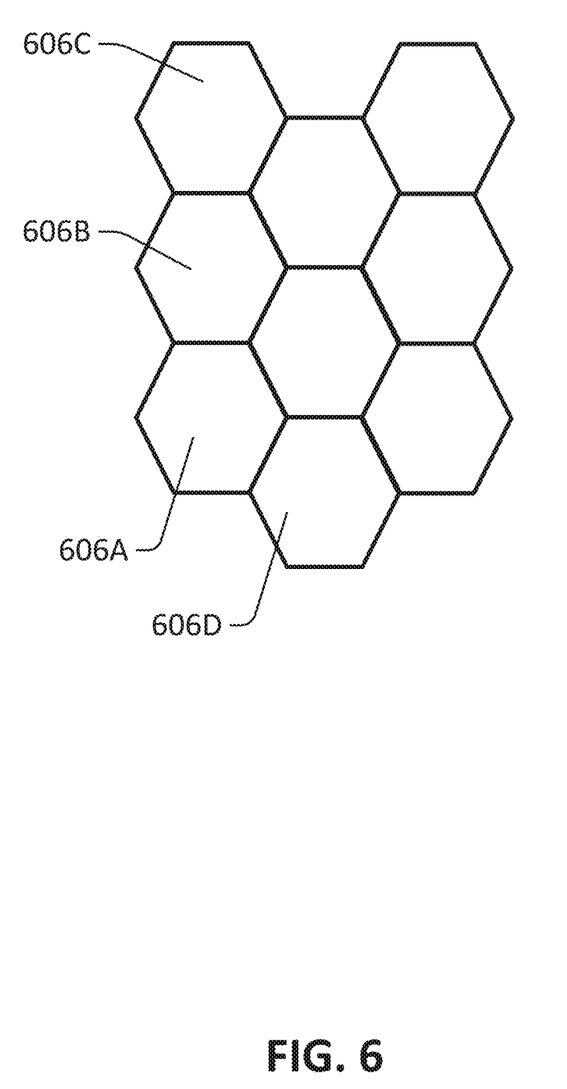
FIG. 6 illustrates an additional perforated baffle structure in accordance with an example of the disclosure.

FIG. 6 illustrates an additional perforated baffle structure in accordance with an example of the disclosure. Each of the baffle structures 604A-C is a hexagonal baffle structure. FIG. 6 can illustrate another configuration of the baffle structure of FIGS. 4-5.

In the top down views shown in FIGS. 3-6, the sides of the baffle structures can be perforated or can be not perforated. In examples where the side walls are not perforated, the top, bottom, and/or any intervening layers in between the top and bottom could be perforated. As described herein, "perforations" can additionally refer to honeycomb structures. For example, the top down views of FIGS. 3-6 can disclose such honeycomb structures and so, the sidewalls of such structures can be solid. Such honeycomb structures can mitigate pulses by flowing fluid through the honeycomb structures.

Figure 7:
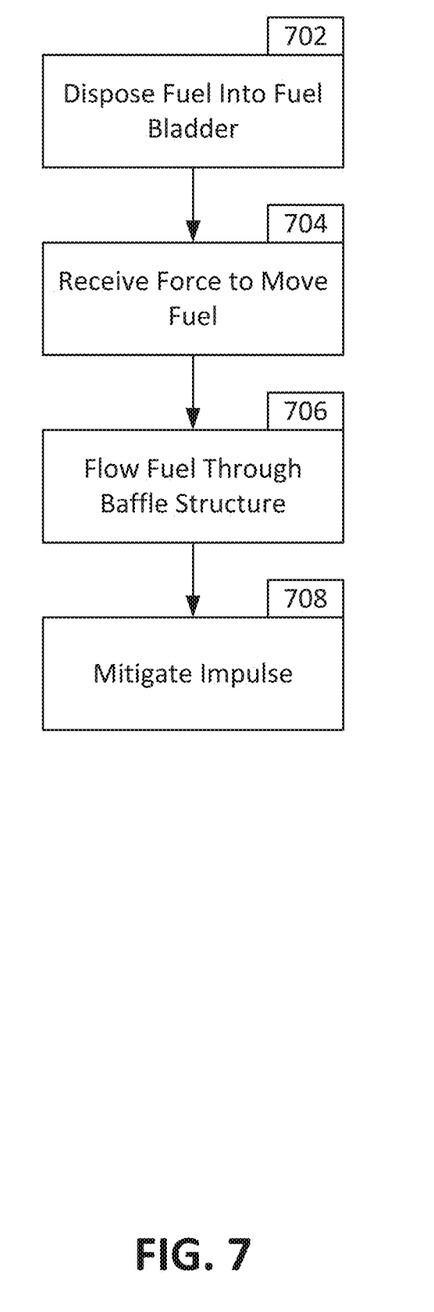
FIG. 7 is a flowchart detailing a method of operation of a fluid bladder in accordance with an example of the disclosure.

FIG. 7 is a flowchart detailing a method of operation of a fluid bladder in accordance with an example of the disclosure. In block 702, fluid is disposed within the fluid bladder. Such a fluid can, for example, be fuel disposed within the fluid bladder.

In block 704, a pulse is received. The pulse can, for example, accelerate or decelerate the fluid bladder. At least a portion of the fluid contained within the fluid bladder, due to inertia, can thus be moving at a velocity different from that of the fluid bladder and, accordingly, impart a pulse, if unmitigated, on the sidewall of the fluid bladder.

After receiving the pulse, the fluid can flow through one or more perforations of baffle structures disposed within the fluid bladder in block 706. In block 708, the pulse can be mitigated by the perforations of the baffle structure.

While examples of perforations described herein include circular perforations, other examples can include perforations of other shapes, such as rectangular, triangular, pentagonal hexagonal, octagonal, and/or other such shapes. Also, as described herein, "perforations" can describe structures additional to openings. For example, "perforations" can also include trapdoors and/or other such structure that can vary the open area of the "perforations." As an illustrated non-limiting example, such "perforations" can include an elastic opening configured to be closed or be a first open area when not subjected to a pulse. However, when subjected to a pulse and/or a pulse greater than a threshold pulse, the elastic opening can open to a second open area. The second open area can be greater than the first open area.

Additionally, while examples of baffle structures described herein can be disposed so that a majority of the volume of the bladder body is contained within the baffle structures, other examples can include bladder bodies where only a minority of the volume of the bladder bodies include baffle structures.

Examples described above illustrate but do not limit the invention. It should also be understood that numerous modifications and variations are possible in accordance with the principles of the present invention. Accordingly, the scope of the invention is defined only by the following claims.

What is claimed is:

1. A fluid bladder comprising:
   a bladder body; and
   a baffle structure disposed within the bladder body and configured to mitigate a pulse of fluid moving within the bladder body before the pulse reaches the bladder body,
   wherein the baffle structure comprises a perforated structure comprising at least a first perforation and a second perforation different in size from the first perforation,
   wherein the first perforation is sized to increase flow resistance through the first perforation to direct less fluid to a first portion of the bladder body,
   wherein the second perforation is sized to decrease flow resistance through the second perforation to direct more fluid to a second portion of the bladder body, and
   wherein the perforated structure comprises a perforated polyhedron box.

2. The fluid bladder of claim 1, wherein the baffle structure is configured to mitigate the pulse of fluid at least when the pulse is within a predetermined pulse range.

3. The fluid bladder of claim 1, wherein mitigating the pulse of fluid moving within the bladder body comprises limiting a peak pulse pressure of the moving fluid.

4. The fluid bladder of claim 1, wherein mitigating the pulse of fluid moving within the bladder body comprises absorbing at least a portion of the pulse, wherein the baffle structure comprises a material configured to deform responsive to absorbing at least the portion of the pulse, and wherein at least one of the perforations is configured to deform responsive to absorbing at least the portion of the pulse.

5. The fluid bladder of claim 4, wherein the at least one deformed perforation is configured to decrease a flow path of the fluid through the at least one deformed perforation.

6. The fluid bladder of claim 1, wherein the polyhedron box comprises a perforated sheet.

7. The fluid bladder of claim 1, wherein the perforated structure comprises a first perforated structure and a second perforated structure.

8. The fluid bladder of claim 7, wherein the first perforated structure is coupled to the second perforated structure.

9. The fluid bladder of claim 1, wherein the baffle structure is coupled to the bladder body via an elastic coupling.

10. A vehicle comprising the fluid bladder of claim 1, wherein the vehicle further comprises a vehicle structure and the fluid bladder is disposed internally within the vehicle structure and/or outside the vehicle structure.

11. The vehicle comprising the fluid bladder of claim 10, wherein the fluid is fuel, and wherein the vehicle is an aircraft and the vehicle structure comprises:
   a fuselage; and
   a wing, wherein the fluid bladder is disposed within at least the fuselage or the wing.

12. A fluid bladder comprising:
   a bladder body; and
   a baffle structure disposed within the bladder body and configured to mitigate a pulse of fluid moving within the bladder body before the pulse reaches the bladder body,
   wherein the baffle structure comprises a perforated structure comprising at least a first perforation and a second perforation different in size from the first perforation,
   wherein the first perforation is sized to increase flow resistance through the first perforation to direct less fluid to a first portion of the bladder body, and
   wherein the second perforation is sized to decrease flow resistance through the second perforation to direct more fluid to a second portion of the bladder body,
   wherein the perforated structure comprises a cylinder with perforated walls.

13. A fluid bladder comprising:
   a bladder body; and
   a baffle structure disposed within the bladder body and configured to mitigate a pulse of fluid moving within the bladder body before the pulse reaches the bladder body,
   wherein the baffle structure comprises a perforated structure comprising at least a first perforation and a second perforation different in size from the first perforation,
   wherein the first perforation is sized to increase flow resistance through the first perforation to direct less fluid to a first portion of the bladder body,
   wherein the second perforation is sized to decrease flow resistance through the second perforation to direct more fluid to a second portion of the bladder body,
   wherein the perforated structure comprises a first perforated structure and a second perforated structure nested within the first perforated structure.

14. A fluid bladder comprising:
   a bladder body; and
   a baffle structure disposed within the bladder body and configured to mitigate a pulse of fluid moving within the bladder body before the pulse reaches the bladder body,
   wherein the baffle structure comprises a perforated structure comprising at least a first perforation and a second perforation different in size from the first perforation,
   wherein the first perforation is sized to increase flow resistance through the first perforation to direct less fluid to a first portion of the bladder body,
   wherein the second perforation is sized to decrease flow resistance through the second perforation to direct more fluid to a second portion of the bladder body,
   wherein the perforated structure comprises a first perforated structure and a second perforated structure, and
   wherein the first perforated structure comprises a first volume and the second perforated structure comprises a second volume different from the first volume.

15. A method comprising:
   receiving a force to move fluid disposed within a bladder body of a fluid bladder;
   moving at least a portion of the fluid through a baffle structure disposed within the bladder body to mitigate a pulse of the fluid moving within the bladder body before the pulse reaches the bladder body, wherein the baffle structure comprises a perforated structure comprising at least a first perforation and a second perforation different in size from the first perforation;
   directing less fluid to a first portion of the bladder body by increasing flow resistance through the first perforation based on a size of the first perforation; and
   directing more fluid to a second portion of the bladder body by decreasing flow resistance through the second perforation based on the size of the second perforation,
   wherein the perforated structure comprises a perforated polyhedron box.

16. The method of claim 15, wherein the baffle structure is configured to mitigate the pulse of fluid at least when the pulse is within a predetermined pulse range.

17. The method of claim 15, wherein mitigating the pulse of fluid moving within the bladder body comprises limiting a peak pulse pressure of the moving fluid.

18. The method of claim 15, wherein mitigating the pulse of fluid moving within the bladder body comprises absorbing at least a portion of the pulse, and wherein the baffle structure comprises a material configured to deform responsive to absorbing at least the portion of the pulse.

19. The method of claim 15, wherein the fluid is fuel.

20. The method of claim 15, wherein the perforated polyhedron box comprises a first perforated polyhedron box comprising a first volume and a second perforated polyhedron box comprising a second volume different from the first volume.

* * * * *